(12) United States Patent
Clapp

(10) Patent No.: US 8,276,920 B2
(45) Date of Patent: Oct. 2, 2012

(54) CARPET SLIDER FOR BABY STROLLERS

(76) Inventor: Dennis Clapp, St-Bruno-De-Montarville (CA)

( * ) Notice: Subject to any disclaimer, the term of this patent is extended or adjusted under 35 U.S.C. 154(b) by 182 days.

(21) Appl. No.: 12/854,270

(22) Filed: Aug. 11, 2010

(65) Prior Publication Data

US 2011/0049820 A1 Mar. 3, 2011

(30) Foreign Application Priority Data

Aug. 27, 2009 (GB) .................................. 0914952.7

(51) Int. Cl.
*B62B 7/12* (2006.01)
(52) U.S. Cl. ............................ 280/7.12; 280/13; 280/727
(58) Field of Classification Search .................. 280/7.12, 280/13, 8, 7.1, 7.11, 33.992, 7.13, 7.14, 7.15, 280/9, 10, 11, 841, 11.115, 11.12, 601, 845, 280/12.1, 12.11, 12.13, 14, 22, 26, 14.1, 280/14.21, 28, 727, 19, 825
See application file for complete search history.

(56) References Cited

U.S. PATENT DOCUMENTS

| | | | | |
|---|---|---|---|---|
| 369,728 A * | 9/1887 | McCray | ........................... | 280/13 |
| 455,778 A * | 7/1891 | Tell | ................................ | 296/20 |
| 596,414 A * | 12/1897 | McNaughton | .................. | 280/13 |
| 813,231 A * | 2/1906 | Nightingale | ..................... | 280/13 |
| 847,900 A * | 3/1907 | Bussell | ............................ | 280/13 |
| 1,656,701 A * | 1/1928 | Eustace | ...................... | 280/47.34 |
| 1,657,534 A * | 1/1928 | Gingold | ........................... | 280/13 |
| 1,783,833 A * | 12/1930 | Elsner | ........................... | 280/604 |
| 2,352,966 A * | 7/1944 | Morando | .......................... | 280/8 |
| 2,443,699 A * | 6/1948 | Swain | .............................. | 280/13 |
| 2,523,950 A * | 9/1950 | Golubics | ......................... | 280/13 |
| 2,747,637 A * | 5/1956 | Brown | .......................... | 150/159 |
| 2,937,878 A * | 5/1960 | Reina | .............................. | 280/13 |
| 3,321,211 A * | 5/1967 | Bryant et al. | ................... | 280/13 |
| 3,632,124 A * | 1/1972 | Cropp | ........................... | 280/845 |
| 3,719,369 A * | 3/1973 | Savage | ............................ | 280/28 |
| 3,771,808 A * | 11/1973 | Duerst | ............................ | 280/19 |
| 3,774,926 A * | 11/1973 | Chase | ............................. | 280/13 |
| 3,851,891 A | 12/1974 | Liu | | |
| 3,924,871 A * | 12/1975 | Mesenbring | .................. | 280/845 |
| 4,191,391 A | 3/1980 | Dorlini | | |
| 4,194,753 A * | 3/1980 | Schrishuhn, Jr. | ............... | 280/13 |
| 4,355,474 A * | 10/1982 | Grim | ................................ | 36/132 |
| 4,413,842 A * | 11/1983 | Loredo | ......................... | 280/825 |
| 4,479,657 A * | 10/1984 | Reynolds | .......................... | 280/8 |
| 4,657,266 A * | 4/1987 | Bohme | .......................... | 280/18 |
| 4,735,423 A * | 4/1988 | Foss | ................................ | 280/18 |
| 4,832,357 A * | 5/1989 | Crew | ......................... | 280/304.1 |
| 4,837,859 A * | 6/1989 | Hamberg | .......................... | 2/467 |
| 5,144,717 A * | 9/1992 | Siesholtz et al. | .................. | 16/47 |
| 5,243,724 A * | 9/1993 | Barnes | ............................. | 5/482 |
| 5,407,217 A * | 4/1995 | Lambert et al. | ................. | 280/10 |
| 5,413,361 A * | 5/1995 | Mosher | ........................ | 280/7.12 |
| 5,441,285 A * | 8/1995 | Russell et al. | .................. | 280/10 |
| 5,445,415 A * | 8/1995 | Campbell | ...................... | 280/825 |
| 5,941,437 A * | 8/1999 | Okumura | ...................... | 224/585 |

(Continued)

*Primary Examiner* — Katy M Ebner
*Assistant Examiner* — Brodie Follman

(57) ABSTRACT

A Carpet slider for baby strollers has a flexible mat on top of which a stroller is placed. A pair of straps curl up the front and the back of the mat. The straps are configured so that, depending upon the way a particular stroller is built, they are joined, from back to front, either on the outside or the inside of the frame holding the wheels so that they are securely held in place and cannot slide off. A pair of rigid member for anchoring the straps and give structural integrity.

1 Claim, 3 Drawing Sheets

U.S. PATENT DOCUMENTS

| | | | |
|---|---|---|---|
| 6,231,483 B1 * | 5/2001 | Phillips | 482/51 |
| 6,682,082 B1 * | 1/2004 | Dalen | 280/7.12 |
| 6,708,989 B1 * | 3/2004 | Braun | 280/7.12 |
| 6,889,882 B1 * | 5/2005 | Leep | 224/579 |
| 6,981,294 B2 * | 1/2006 | Edwards | 16/42 R |
| 7,192,059 B2 * | 3/2007 | Guyon et al. | 280/825 |
| 7,832,743 B2 * | 11/2010 | Small | 280/19 |
| 8,127,895 B2 * | 3/2012 | Keating | 188/5 |
| 2003/0025284 A1 * | 2/2003 | Edwards et al. | 280/7.12 |
| 2003/0209579 A1 * | 11/2003 | Postel | 224/184 |
| 2004/0140661 A1 * | 7/2004 | Guyon et al. | 280/825 |
| 2006/0055130 A1 | 3/2006 | Williams, Jr. | |
| 2007/0122066 A1 * | 5/2007 | Landay | 383/16 |
| 2007/0235958 A1 * | 10/2007 | Small | 280/19 |
| 2007/0236000 A1 * | 10/2007 | Small | 280/845 |
| 2008/0018067 A1 * | 1/2008 | Small | 280/19 |
| 2008/0265557 A1 * | 10/2008 | Walkingshaw et al. | 280/845 |
| 2009/0070930 A1 * | 3/2009 | Roman | 5/120 |
| 2009/0200762 A1 * | 8/2009 | Whiteley et al. | 280/8 |
| 2010/0289231 A1 * | 11/2010 | Huot | 280/13 |
| 2011/0278805 A1 * | 11/2011 | Proch et al. | 280/19 |
| 2012/0030877 A1 * | 2/2012 | Beck | 5/655 |

* cited by examiner

CARPET SLIDER FOR BABY STROLLERS

This application claims priority based on application GB0914952.7 filed Aug. 27, 2009

FIELD OF THE INVENTION

The present invention relates generally to baby carriages but more particularly to a means for converting a stroller for winter use.

BACKGROUND OF THE INVENTION

There exists many types of baby strollers and there are also many types of snow sliding devices, including sliding carpets. Typically, baby strollers have wheels and, as there are horse drawn sleighs for use in winter, there are also sleigh strollers for use on snow. Although there are kits and various attempts at converting a wheel stroller to a stroller that can be used on snow, they are either too complicated to install or unreliable.

SUMMARY OF THE INVENTION

In view of the foregoing disadvantages inherent in the known devices now present in the prior art, the present invention, which will be described subsequently in greater detail, is to provide objects and advantages which are:

To provide for a convenient, easy and economical way of converting a wheel baby stroller into a sliding baby stroller for use on snow.

To attain these ends, the present invention generally comprises a flexible mat member adapted to retain the wheels of one of the strollers thereon; a pair of strap members attached to the mat member such that when in use the strap members curl up opposite edges of the mat member, which are then adapted to wrap around front and back wheels of the one of the strollers, and thereby adapted to be securely and removably attached to the one of the strollers in order to make the strollers slidable on surfaces such as carpets.

In a preferred embodiment, the carpet slider further comprises a pair of elongated rigid members secured to the mat member, and adapted to respectively engage both front and both back wheels of one of the strollers.

Each of the strap members includes an adjustable buckle adapted to respectively tighten the mat member around respective front and back wheels of the one of the strollers.

In a preferred embodiment, a combination of a stroller and a carpet slider has a stroller including a pair of front wheels attached to a front axle, and a pair of back wheels attached to a back axle; and a carpet slider including a flexible mat member adapted to retain the front and back wheels of the stroller thereon, a pair of strap members attached to the mat member such that when in use the strap members curl up opposite front and back edges of the mat member, which are then adapted to wrap around the front and back wheels of the stroller, and thereby securely and removably attached the mat member to the stroller in order to make the strollers slidable on surfaces such as carpets.

The combination stroller carpet slider wherein the stroller includes frame members, and wherein each of the strap members are joined from the back of the stroller to the front of the stroller through the frame members to thereby more securely tighten the mat member around the wheels of the stroller.

A means for converting a stroller for winter, the means includes a flexible mat member adapted to retain the wheels of the stroller thereon; a pair of strap members attached to the mat member such that when in use the strap members curl up opposite edges of the mat member, which are then adapted to wrap around the front and back wheels of the stroller, and thereby adapted to be securely and removably attached to the stroller in order to make the stroller slidable on surfaces covered in ice or snow.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1:
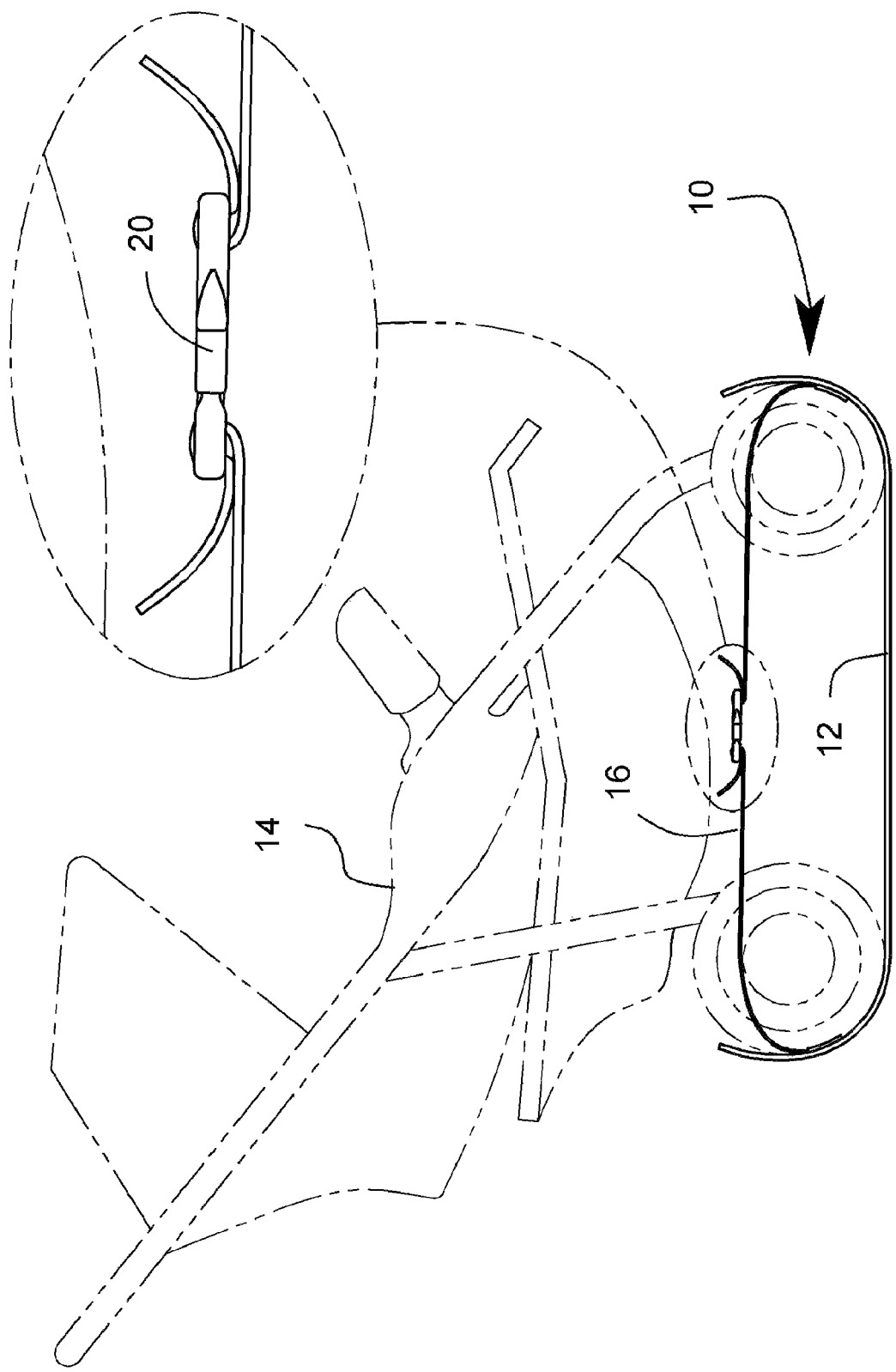
FIG. 1 Side view of the invention in context.
Figure 2A:
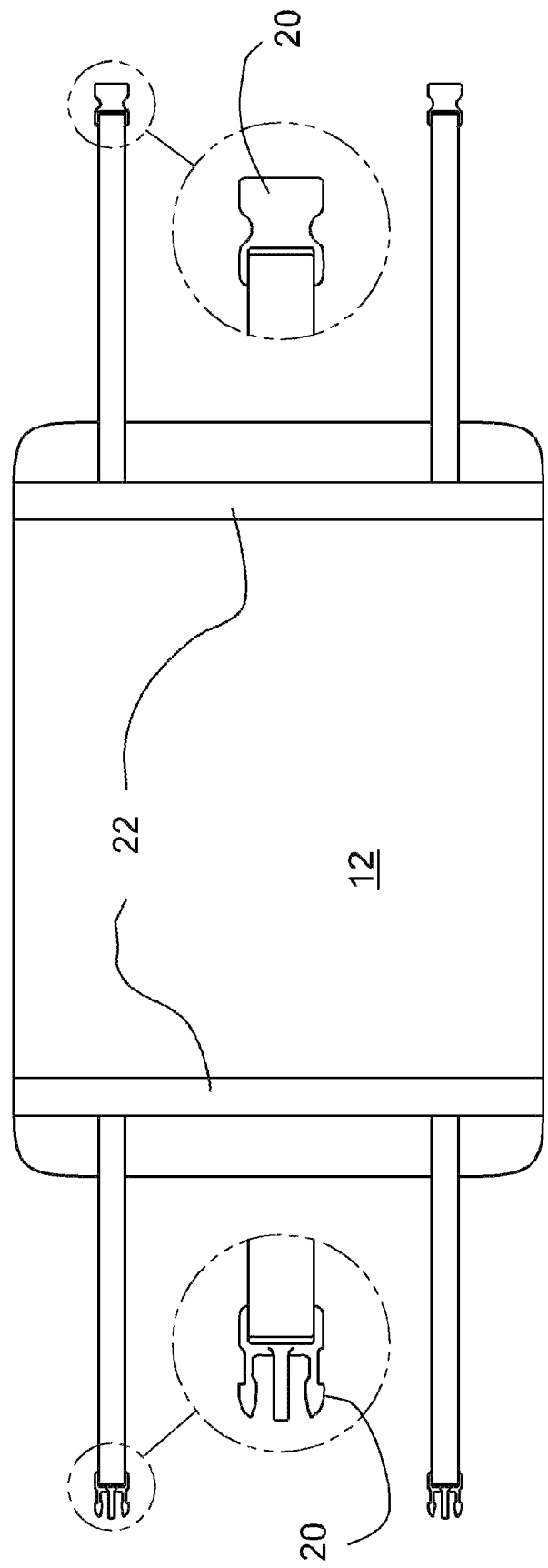
FIGS. 2*a-b* Top and side views, respectively, of the invention.
Figure 2B:
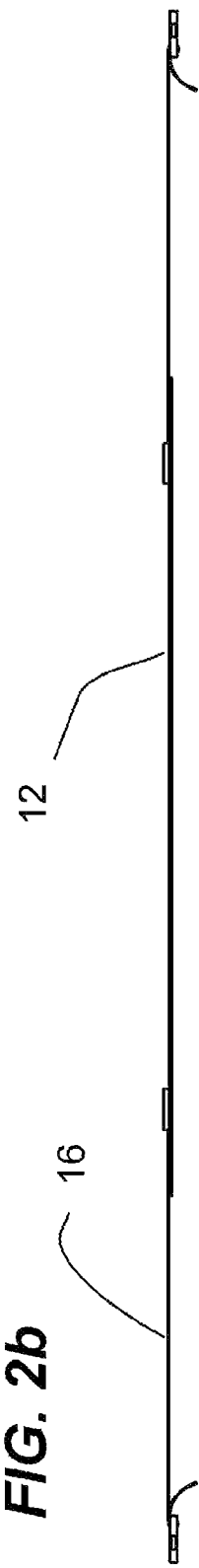
Figure 3:
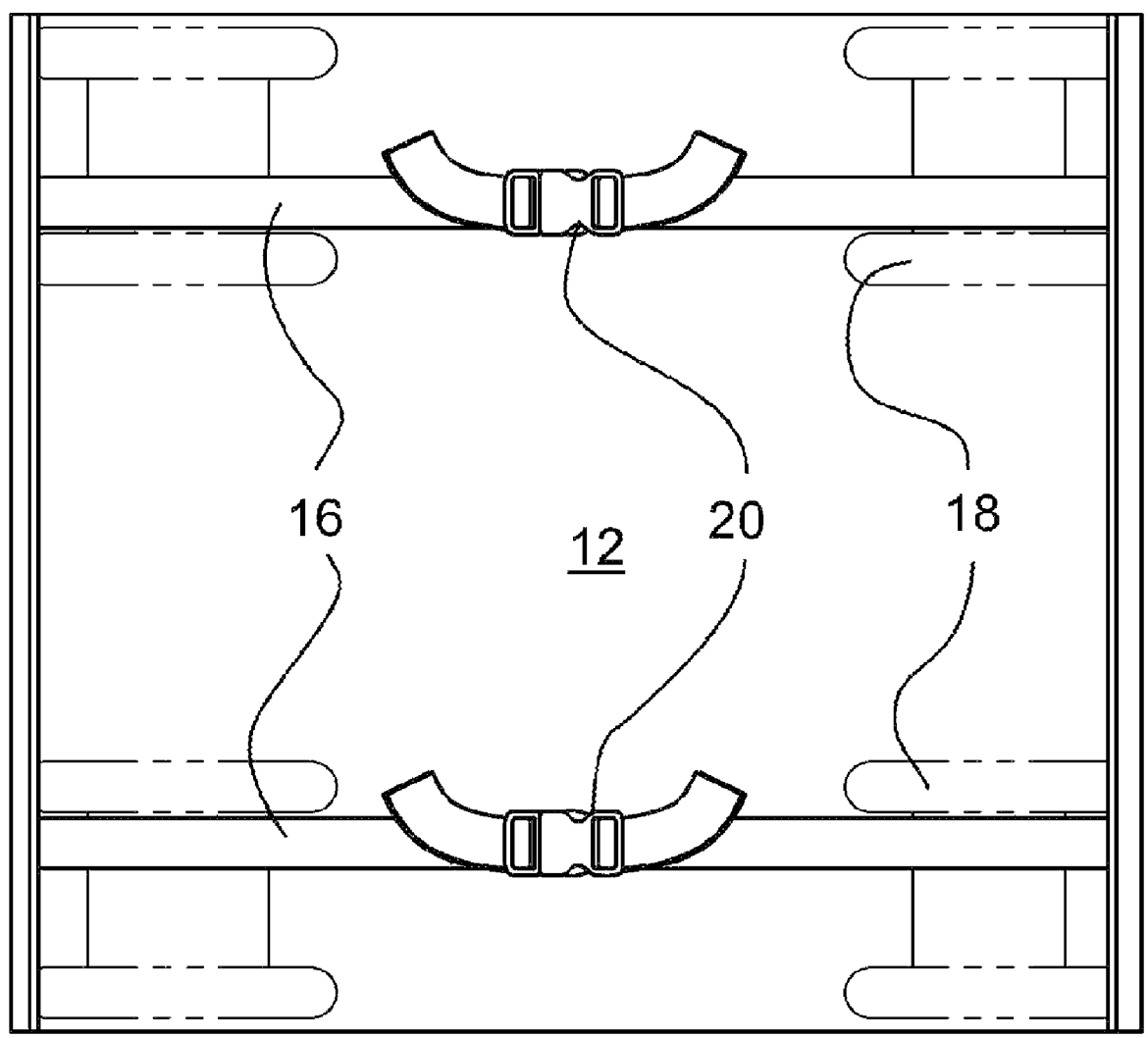
FIG. 3 Top view of the invention installed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

A carpet slider for baby strollers (10) consists in a flexible mat (12), or carpet on top of which a stroller (14) is positioned by retaining the stroller's (14) wheels (18) onto the mat (12) by way of straps (16).

The straps (16) curl up the front and the back of the mat (12) so that it is tightly wrapped around the wheels (18) of the stroller (14).

The straps (16) are configured so that, depending upon the way a particular stroller (14) is built, they are joined, from back to front, either on the outside or the inside of the frame holding the wheels (18) so that they are securely held in place and cannot slide off.

A set of adjustable buckles (20) clip each strap (16) together, as is known in the art.

A pair of rigid members (22) give adequate anchoring integrity as well as a rigid front and back sections, across the width.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A combination of a stroller and a carpet slider comprising a stroller including a pair of front wheels attached to a front axle, and a pair of back wheels attached to a back axle; and a carpet slider including a flexible mat member adapted to retain said front and back wheels of said stroller thereon, a pair of strap members attached to said mat member such that when in use said strap members curl up opposite front and back edges of said mat member, which are then adapted to wrap around said front and back wheels of said stroller, and thereby securely and removably attaches said mat member to said stroller in order to make said stroller slidable on surfaces;

a pair of elongated rigid members secured to said mat member, and adapted to respectively engage both front and both back wheels of said stroller;

each of said strap members includes an adjustable buckle adapted to respectively tighten said mat member around respective front and back wheels of said stroller;

said mat member further includes a pair of elongated rigid members secured thereto, and adapted to respectively engage both front and both back wheels of said stroller.

* * * * *